United States Patent [19]

Osteen et al.

[11] Patent Number: 5,397,625
[45] Date of Patent: Mar. 14, 1995

[54] DUO-FUNCTIONAL NONWOVEN MATERIAL

[75] Inventors: D. Keith Osteen, Marietta; Hannong Rhim; Lawrence H. Sawyer, both of Roswell; E. G. Varona; M. Chris Wanek, both of Marietta, all of Ga.; Kenneth Y. Wang, Westchester, Pa.

[73] Assignee: Kimberly-Clark Corporation, Neenah, Wis.

[21] Appl. No.: 983,103

[22] Filed: Nov. 24, 1992

Related U.S. Application Data

[63] Continuation of Ser. No. 629,940, Dec. 20, 1990, abandoned.

[51] Int. Cl.$^6$ .......................... B32B 3/10; B32B 5/02; B32B 7/00; B32B 5/22
[52] U.S. Cl. .......................... 428/224; 428/139; 428/233; 428/234; 428/247; 428/255; 428/286; 428/296; 428/298; 428/299; 428/300
[58] Field of Search .................. 428/85, 90, 102, 231, 428/234, 235, 255, 286, 296, 299, 300, 139, 233, 247, 298

[56] References Cited

U.S. PATENT DOCUMENTS

| | | | |
|---|---|---|---|
| 2,294,898 | 9/1942 | Fourness et al. | 128/284 |
| 3,078,849 | 2/1963 | Morse | 128/290 |
| 3,243,861 | 4/1966 | Kumin et al. | 428/234 |
| 3,546,755 | 12/1970 | Lynch, Jr. | 28/72.2 |
| 3,556,919 | 1/1971 | Johns et al. | 161/70 |
| 3,561,447 | 2/1971 | Alexander | 128/290 |
| 3,616,797 | 11/1971 | Champaigne et al. | 128/290 |
| 3,635,221 | 1/1972 | Champaigne, Jr. | 128/290 |
| 3,923,592 | 12/1975 | George et al. | 162/168 |
| 3,950,587 | 4/1976 | Colijn et al. | 428/255 |
| 3,967,623 | 7/1976 | Butterworth et al. | 128/287 |
| 3,974,319 | 8/1976 | Alibeckoff | 428/234 |
| 3,994,771 | 11/1976 | Morgan, Jr. et al. | 162/113 |
| 4,042,740 | 8/1977 | Krueger | 428/138 |
| 4,103,058 | 7/1978 | Humlicek | 428/171 |
| 4,119,752 | 10/1978 | Smart | 428/234 |
| 4,159,360 | 6/1979 | Kim | 428/234 |
| 4,207,367 | 6/1980 | Baker, Jr. | 428/171 |
| 4,252,590 | 2/1981 | Rasen et al. | 156/167 |
| 4,382,987 | 5/1983 | Smart | 428/234 |
| 4,405,324 | 9/1983 | Cruz, Jr. | 604/376 |
| 4,482,601 | 11/1984 | Hartigan, Jr. | 428/234 |
| 4,639,390 | 1/1987 | Shoji | 428/195 |
| 4,710,185 | 12/1987 | Sneyd, Jr. et al. | 604/372 |
| 4,741,941 | 5/1988 | Englebert et al. | 428/71 |
| 4,787,947 | 11/1988 | Mays | 156/160 |
| 4,790,836 | 12/1988 | Brecher | 604/359 |
| 4,830,915 | 5/1989 | Diaz-Kotti | 428/300 |

FOREIGN PATENT DOCUMENTS 6011202 4/1976 Japan .................... 428/234

Primary Examiner—Jenna L. Davis
Assistant Examiner—Kathryne E. Shelborne
Attorney, Agent, or Firm—Patrick C. Wilson

[57] ABSTRACT

Disclosed herein is a duo-functional nonwoven composite having a support layer with a top surface and a bottom surface separated by a thickness. On the bottom surface of the support layer is a fibrous nonwoven web with all or a portion of the fibers being formed from a material which is soluble in a fluid such as water. At least a portion of the fibers extend through the thickness of the support layer from the bottom surface and project beyond the top surface to give the top surface a cloth-like appearance. Upon wetting the top surface of the support layer by a fluid such as water, urine or menses, the soluble fibers begin to shrink and dissolve until all or a portion of the filaments have retracted back into and through the thickness of the support layer. In so doing, the applied fluid is transported substantially away from the top surface of the composite. As a result, when the material of the present material is used as a liner material for personal care products, it initially provides a surface which is more cloth-like and comfortable to the wearer. However, after being insulted, the soiled portion of the nonwoven dissolves and retracts back into the composite thereby giving a cleaner, dryer appearance as is more commonly found when using films.

4 Claims, 1 Drawing Sheet

DUO-FUNCTIONAL NONWOVEN MATERIAL

This is a continuation of copending application Ser. No. 07/629,940 filed on Dec. 20, 1990, now abandoned.

BACKGROUND OF THE INVENTION

The present invention relates to a duo-functional nonwoven material. More specifically, the present invention is a material which has a cloth-like appearance and feel due to the fibrous component. However, upon wetting of the structure on one surface, the fibrous portion of the material starts to dissolve and move toward the underlying support structure which is most typically a net-like material. As a result, both the fluid and a portion of the fibrous web material are transported through the support material thereby leaving a cleaner, dryer surface. While having a wide variety of uses, the material of the present invention is particularly well suited for use as a cover material for personal care products such as diapers, training pants, sanitary napkins, incontinence garments, wound dressings and the like.

Nonwoven materials are constantly being used in an ever increasing number of areas due to the wide variety of properties that can be engineered into their design. As a result, nonwovens have been used to supplant cloth in numerous products. This has been particularly true in the area of personal care products, most commonly in the area of liner materials for diapers, sanitary napkins and incontinence garments.

When using nonwovens as liner materials it is usually desirable to make the nonwoven as soft and cloth-like as possible since this is the material which will have the highest degree of contact with the wearer. Unfortunately, in making the material more cloth-like it will often have a greater tendency to retain fluids in a fibrous matrix. This is especially true with respect to menses and urine when they contact the respective liner materials of sanitary napkins and diapers. To overcome this problem, some designs have gone to the use of perforated films, film-like materials, and netting materials. Unfortunately, while films and netting materials will sometimes provide cleaner, dryer surfaces after being insulted by urine and menses, they also tend to have a slick, plastic feel which is commonly viewed as a disadvantage by the user. Further, film materials tend to be less breathable thereby making them hotter and less comfortable to the wearer. Consequently, the design of liner materials for personal care products has often been a compromise situation.

It is therefore an object of the present invention to provide a material which will combine the properties of both cloth and film thereby forming a duo-functional material.

It is another object of the present invention to provide a material which initially has the appearance and properties of a cloth-like nonwoven material, however, upon wetting exhibits properties more like a film or net material.

It is yet another object to provide a process for forming a material according to the present invention.

These and other objects of the present invention will become more apparent upon a further review of the following specification, drawings and claims.

SUMMARY OF THE INVENTION

The present invention relates to a duo-functional nonwoven material which has a cloth-like appearance and feel due to the fiberous component. Upon wetting of the structure the fibrous portion of the material starts to dissolve and shrink toward the underlying support structure which is most typically a net-like material. As a result, both the fluid and the fibrous web material are transported through the support material thereby leaving a cleaner, dryer surface. The material of the present invention is particularly well suited for use as a cover material for personal care products such as diapers, sanitary napkins, training pants, incontinence garments, wound dressings and the like.

The material of the present invention is best described as a fluid-dissolvable nonwoven web composite comprising a support layer made from a mesh-like material having a top surface and a bottom surface separated by a thickness. A nonwoven web is placed in juxtaposition with the bottom surface of the support layer. The nonwoven web includes a plurality of fibers which are soluble in the fluid and at least a portion of these fibers extend through the thickness of the support layer from the bottom surface to and above the top surface of the support layer such that upon wetting by a fluid, the fibers dissolve and retract toward the bottom surface of the support layer. The soluble fibers are made from a material selected from the group consisting of natural and synthetic water soluble polymers having a degree of polymerization ranging from approximately 200 to 3000. The support layer for the composite may be made from at least one of three types of materials. The first type of material is a stationary open mesh structure such as a net, screen or perforated film which is not expanded or contracted during the formation process. The second type of support layer material is elastic in nature and is capable of being expanded in at least one direction from a first length to a second length which is greater than the first length to make it easier for the fibers of the nonwoven web to be projected through the thickness of the support layer. The third type of support layer material is heat shrinkable and has a first length before being heated and a second length after being heated which is less than the first length. Again, a more open initial structure permits the fibers of the nonwoven web to be passed through the thickness of the support layer more easily. Subsequent to the passing of the fibers through the support layer structure, the composite may be heated to shrink the support layer to a smaller open area thereby more firmly securing the fibers within the structure of the support layer.

The material of the present invention can be formed by at least three methods. The first involves forming a web comprising a plurality of fibers onto a bottom surface of a support layer to form a composite. At least a plurality of the fibers extend through the thickness and extend above the top surface of the support layer. In the second formation process the support layer is a heat shrinkable material. Once again a web comprising a plurality of fibers is formed onto the bottom surface of the support layer while the support layer has a first length. At least a plurality of the fibers from the nonwoven web extend through the thickness of the support layer and extend above the top surface of the support layer. Once the nonwoven web has been formed on and through the support layer, heat is applied to the composite to shrink the support layer to a second length which is less than the first length of the support layer thereby contracting the support layer about the fibers of the nonwoven web. The third formation process involves the use of a stretchable or elastic support layer. The support layer is stretched from a first generally relaxed state to a second expanded state. A nonwoven web containing a plurality of fibers is then formed onto the bottom surface of the support layer to form the composite with a least a plurality of the fibers extending through the thickness and above the top surface of the support layer. Next, the support layer is allowed to retract from its expanded state towards its first generally relaxed state thereby causing the support layer to contract about and retain the fibers within the support layer.

A material once formed according to the present invention may be used as a cover stock for personal care products. As the fibers are contacted by a fluid, the fluid soluble fibers start to dissolve and retract into and below the support layer. In so doing, the material is capable of taking on a fluid while in a cloth-like state and then transporting the fluid and the soluble fibers down into and below the support layer thereby leaving the surface of the material cleaner looking and more film-like in nature.

DETAILED DESCRIPTION OF THE INVENTION

Figure 1:
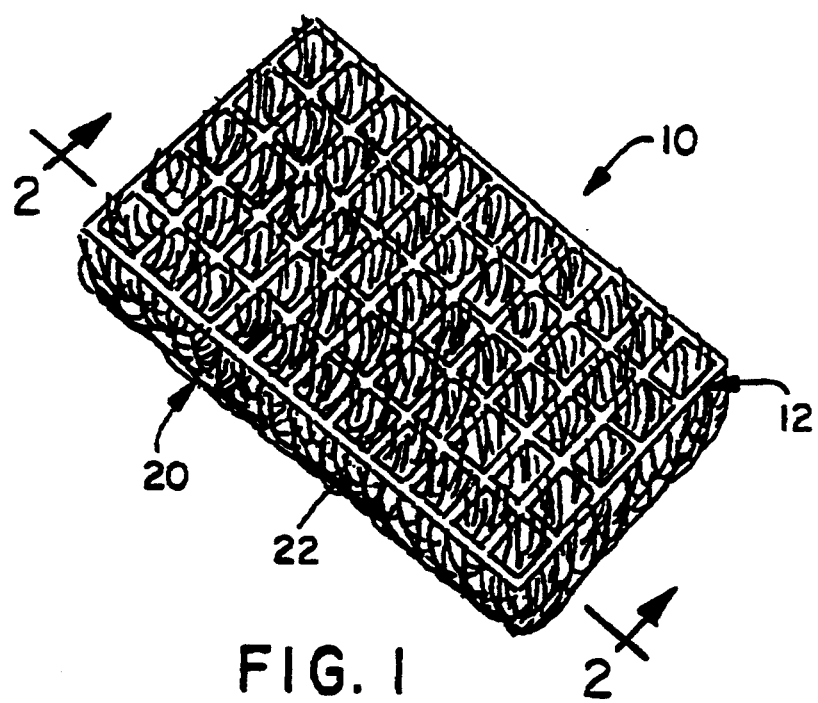
FIG. 1 is a perspective view of a duo-functional nonwoven composite according to the present invention.
Figure 2:
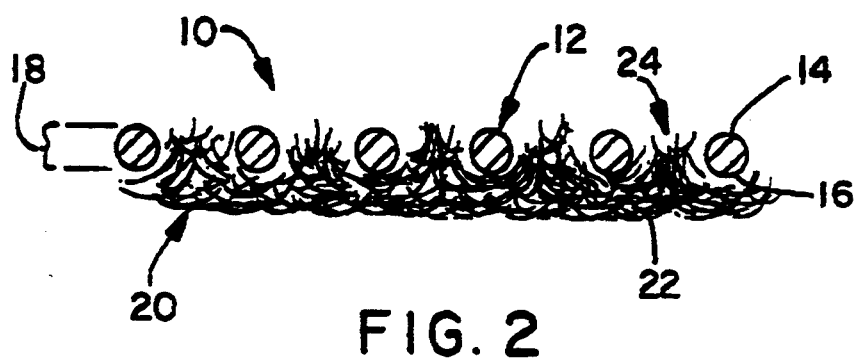
FIG. 2 is a partial side view of the duo-functional nonwoven composite of FIG. 1 taken along line 2—2.
Figure 3:
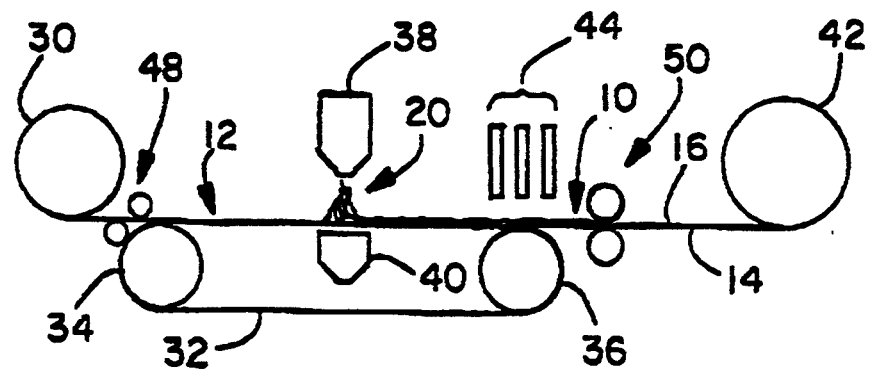
FIG. 3 is a schematic side view of a process for forming a duo-functional nonwoven composite according to the present invention.

The present invention relates to a duo-functional nonwoven composite 10 as shown in FIGS. 1 and 2 and the process as shown in FIG. 3. The composite 10 includes a support layer 12 including a top surface 14 and a bottom surface 16 separated by a thickness 18. Extending through the support layer 12 from the bottom surface 16 to the top surface 14 is a nonwoven web 20 comprised of a plurality of fibers 22 at least a plurality of which are made of a fluid-soluble material.

The primary function of the support layer 12 is to provide a forming surface onto which the nonwoven layer 20 can be deposited. To maximize the functional utility of the composite 10, the support layer 12 should have a sufficient amount of open area to permit the nonwoven web 20 to be formed on the bottom surface 16, yet have a plurality of its fibers 22 extend through the thickness 18 to project above the top surface 14 of the support layer 12. To accomplish this, the support layer 12 can be made from a variety of materials including netting materials, net-like materials such as films which have been slit and then stretched in one or more directions and films which have been apertured or perforated. Additional materials which would be suitable for use as a support layer 12 would include screening, scrim materials and perforated or apertured nonwoven materials such as spunbond and low basis weight nonwovens through which the nonwoven layer 20 can be formed or extended as by needling. Lastly, woven and knitted materials could also be used. With all of the above materials there must be a balancing between the material chosen, the, degree of openness of the material, the fiber size and characteristics of the nonwoven web 20 used, and the process chosen to deposit the nonwoven web onto the support layer 12 and extend it through the thickness 18.

Two of the above support layer materials were chosen for testing. The first material was a netting material and the second was a screen material. These two materials were selected because of their structural integrity and degree of openness to maximize the amount of fiber extending through to the top surface 14 from the bottom surface 16 of the support layer 12. Generally speaking, the more open the structure of the support layer 12, the easier it is to extend the fibers 22 of the nonwoven web 20 through the support layer 12. Conversely, the larger the openings, the less masking ability the support layer will have once the fibers have been wetted. When using net, screen and scrim materials, the size of the materials can be best characterized by mesh count ranging between approximately 5 to 40 strands per 2.54 centimeters. Typically, mesh counts in at least one direction will range from about 10 to about 40 mesh. With these and other materials, the degree of openness can also be described as percent open area. In all cases it is desirable to have a percent open area of at least 30% based upon the total surface area on one side of the material.

In addition, it should be appreciated that the various materials used to make the support layer 12 can also be made from stretchable/elastic materials or heat shrinkable materials. With elastic materials the support layer can be stretched prior to the formation of the nonwoven web onto the support layer 12. As a result, the openings 24 in the support layer 12 can be made bigger thereby allowing more of the fibers 22 through to the top surface 14 where they can contact deposited fluids. Once the fibers 22 have been extended through the elastic support layer 12, the support layer 12 can then be relaxed to anchor the fibers 22 in place. Conversely, the support layer 12 can be made of a heat shrinkable material such as a perforated film or a netting material made from, for example, ethylene vinyl acetate, polyester and polyolefins including polypropylene and polyethylene. In such cases, the openings in the material should initially be larger than ultimately intended so that upon heating, the openings will shrink and hold the fibers 22 in place.

The nonwoven layer 20 is made up of a plurality of fibers or filaments 22 which can be made from any number of extrusion and spinning technologies including melt blowing, spunbonding, carding, melt spinning, and solution spinning. The fibers 22 are deposited onto the bottom surface 16 of the support layer 12 and then extended through the thickness 18 so as to project above the top surface 14. The fibers 22, themselves, can be made from a wide variety of extrudable/spinnable materials, however, with respect to the present invention, it is desireable to have all or at least a plurality of the fibers formed from a fluid-soluble material. Depending upon the particular use intended, the fiber's material can be water-soluble or soluble in other fluids such as organic solvents. In addition, combinations of fibers and fiber materials can be used such as, for example, soluble and nonsoluble fibers or a combination of fibers some of which are soluble in water or water-based fluids (such as urine or menses) and the remainder of which are soluble in some other fluid such as an organic solvent.

Besides the selection of fiber material, the size of the fibers can be varied. Smaller fibers are generally easier to extend through the support layer 12, especially when the openings in the support layer are smaller. Smaller fibers are generally softer thereby making the composite 10 softer which is usually desirable when the composite is intended to be used as, for example, a liner material for personal care products. In addition, smaller diameter fibers have a much higher surface area to volume ratio thereby making them more susceptible to dissolution in the desired fluid. Conversely, larger fibers tend to be more rigid. Thus, larger fibers may be more desirable when a stronger more durable material is needed. When a support layer with large openings is being used it again may be more desirable to use the larger fibers to ensure their entrapment within the support layer. If the fibers are too small in diameter and length they may be carried directly through the support layer 12 and not be retained thereon and therein. Further, a combination of fiber sizes can be used to combine attributes. Typically, however, the fibers' diameters should range in size from about 0.1 micrometer to about 80 micrometers.

Lastly, the material chosen to form the soluble fibers can be engineered to have varying solubilities and other properties. When designing a composite according to the present invention for use in a personal care product, the soluble polymer chosen should be compatible with urine and menses. As a result, such polymers should readily dissolve when contacted by such fluids at room and body temperature, i.e., temperatures ranging from about 60 to 100 degrees Fahrenheit. Examples of such water soluble resins include polyvinyl alcohol, polyethylene oxide, polyacrylamide and cellulosic materials such as hydroxyethyl, hydroxypropyl, methyl, carboxymethyl, polyvinyl pyrrolidone, polypeptide, polysacharide, etc. In a broader sense, any water soluble linear synthetic and natural polymers with a degree of polymerization of from approximately 200–3000 will work with the present invention. In addition, if desired, blends of such polymers can be used in conjunction with one another or with other more soluble fibers or fibers which are soluble in other non-water-based fluids to give a range of solubilities.

When polyvinyl alcohol is being used as the soluble fiber it has been found that the polymer will work well when it has a molecular weight in the range of 30,000 to 150,000 and has been hydrolyzed in the range of 87 to 99.9 percent. One source of this material is the "Airvol" series from Air Products and Chemicals, Inc. of Allentown, Pa., such as "Airvol" 107, 125, 203, 205, 325, 350, 425, 523, 540 and WS-42. It has also been found that these particular fibers work well when their fiber sizes fall in the range of 1 to 30 microns and the basis weight of the nonwoven web ranges from about 5 to about 15 grams per square meter.

Formation of the composite 10 of the present invention can be accomplished via several processes depending upon the particular materials being used. Referring to FIG. 3 there is shown in schematic form a process for forming the composite material of the present invention. Generally, a layer of support material 12 is unwound from a supply roll 30 onto a continuous belt forming surface 32 driven by a pair of drive rollers 34 and 36. The support layer 12 is passed under a piece of extrusion/spinning equipment 38 which forms the fibrous nonwoven web 20 and deposits the fibers 22 onto the bottom surface 16 of the support layer 12. In order to ensure great fiber penetration through net openings, the forming distance between the bottom tip of the spinning equipment 38 and the forming surface 32 should be as short as possible but within a limit that the fiber or the forming air temperature will not destroy the support netting material. Also, it is desirable for the forming air to be exhausted through the support material opening as much as possible by adjusting the polymer throughput, line speed and the under-belt vacuum. To assist in drawing the fibers through the thickness 18 of the support layer 12 from the bottom surface 16 to the top surface 14, a vacuum unit 40 may be placed underneath the foraminous belt 32. The vacuum may be adjusted up or down or not used at all depending upon the conditions. The vacuum has been found most useful when the support layer has a very closed mesh size since, under such conditions, it is more difficult to drive the fibers 22 through the support layer 12 without additional help. Once the composite material 10 has been formed, it may be taken up on a take-up roll 42 or the material 10 may continue in-line for additional processing (not shown).

Minor changes can be made in the above prowess when the support layer is stretchable or heat shrinkable. When heat shrinkable materials are used, the process shown in FIG. 3 will further include a heating step or heat from the forming process can simultaneously initiate shrinkage. To accomplish this a heating source 44 such as an infra-red heater or hot air heater can be placed in-line between the fiber forming equipment 38 and the take-up roll 42. If additional heating is needed, other heating units (not shown) can be added above and/or below the composite 10.

Referring again to FIGS. 2 and 3, when using a heat shrinkable support layer 12, it is first unwound from roll 30 and passed under the fiber extrusion equipment 38. At this point the heat shrinkable material will have a plurality of openings 24 having a first or pre-shrunk size. As the fibers 22 are formed onto the bottom surface 16 they are drawn or forced through the openings 24 of the support layer 12 such that they extend beyond the top surface 14. Having formed the nonwoven web 20 through the openings 24, the composite 10 is then passed under the heating unit 44 and heated to a temperature sufficient to heat and shrink the support layer 12 such that the openings 24 contract to a second or shrunk size which is smaller than the first size of the openings 24. When using a heat shrinkable support layer 12, care should be taken not to heat the fibers 22 of the nonwoven web 20 to the point that they are adversely affected. To help reduce this problem it may be advisable to use a heat shrinkable material which will activate/shrink at a temperature in the range of 10 degrees Celsius or more below the melting point of the nonwoven fibers or support layer. Once the support layer 12 has been shrunk, the composite 10 can be wound-up on roll 42 or sent for further in-line processing (not shown).

In yet another variation of the present process, the support layer used can be and elastic or stretchable material such as the netting material described in commonly assigned U.S. Pat. No. 4,710,185 wherein the netting material is composed of an ethylene vinyl acetate copolymer. When using an elastic or extensible material, the process of FIG. 3 can be further modified by the addition of a first set of driven nip rollers 48 before the extrusion/spinning equipment 38 and a second set of driven nip rollers 50 after the extrusion equipment 38. By passing the support layer 12 through both sets of nip rollers and driving the second set 50 faster than the first set 48, the support layer 12 can be stretched in the machine direction. The degree of stretch will depend upon the characteristics of the material, however, it generally is advisable not to stretch the support layer 12 beyond its elastic limit so as to permanently deform the material.

To use the process as modified above, the elastic support layer material 12 is unwound from roll 30 and passed between the first and second sets of nip rollers 48 and 50 with the second set of nip rollers 50 being driven faster than the first set 48 so as to stretch the layer 12 in the machine direction. As the stretched layer 12 is passed underneath the extrusion/spinning equipment 38 fibers 22 of the nonwoven web 20 are deposited on and through the openings 24 of the support layer 12. Once the composite 10 has been formed and has passed the second set of nip rollers 50, the composite 10 is wound up on wind-up roll 42 which is moving at a speed slower than the second set of nip rollers 50 so as to allow the composite to shrink back to all or at least some portion of its original length. Conversely, in lieu of the wind-up roll 42, the composite 10 may continue in line (not shown) for further processing. Alternatively a tenter frame may be incorporated to provide biaxial stretch. Care should also be taken when stretching in only one direction, the machine direction for example, that the support layer does not collapse in the other direction, cross-direction. Once again a tenter frame will reduce the chance of this happening.

EXAMPLE

A net material supplied by Nalle Plastics of Austin, Tex. comprising 93 to 100 percent ethylene vinyl acetate in combination with 0 to 7 percent titanium dioxides was selected as a substrate matrix. The net comprised two arrays of filaments oriented at a displacement angle in the range of 20 to 90 degrees to form a reticular network. Generally, nets suitable for the present invention are characterized by mesh counts of 5–40 strands per 2.54 cm, basis weights of about 17 to 170 grams per square meter, calipers of about 0.1 to 0.8 millimeters and percent open areas of about 30 to 60%. The base net material selected for evaluation had a basis weight of about 85 grams per square meter, a caliper of 0.8 millimeters, a displacement angle of 46 degrees and an open area of 59% as determined by image analysis using a Cambridge Instrument "Quantimet 900". The base net was bi-axially cold drawn to twice its original length in the machine direction and four times its original width in the cross-direction, though total expansion in either direction may be as high as six times the original dimension to increase the total open area and the space between adjacent filament members, thus providing enhanced penetration of blown or sprayed fibers. A 20% aqueous solution was prepared from an approximately 89% hydrolyzed water-soluble polyvinyl alcohol having a molecular weight of approximately 78,000 using a glass reaction kettle at 100° to 110° C. with stirring for five hours followed by deaeration for three to five hours. The polyvinyl alcohol polymer was "Airvol 523" manufactured by Air Products of Allentown, Pa. The solution was added to a 40 cubic centimeter piston extruder and extruded at 90 °C. through a nozzle assembly containing a single 0.4 mm hole at a rate of 0.26 grams per minute. Compressed air was humidified by injecting steam into it and the humidified air at a rate of 0.03 to 0.09 cubic meters per minute was used to attenuate the extruded solution into fibers. The resulting fibers were then dried by impinging them with secondary dry air at approximately 200°–300° C., which also served to direct the fibers to the net substrate under which a vacuum of approximately 50–125 cm of water was applied. The PVOH fibers penetrated the net open areas, forming fibrous protrusions on the opposite side of the net. The fibers were in tufts and ranged in size from sub-micron to 30 microns. The size could be controlled by adjusting the flow of the humidified air and also the secondary dry air to some extent. Reduced vacuum and lower air velocities could be used with the cold drawn net to achieve better fiber penetration with nets that had been stretched or cold drawn as described above to increase the size of the net openings. After fiber incorporation, the fibers/net composite nonwoven was heated in an oven at 90° C. for three minutes to shrink the net to a more closed structure. The net reacted rapidly in response to elevated temperatures and the three-minute exposure time was to ensure that the oven had equilibrated to 90° C. The heat-treated net recovered a substantial portion of the cold-drawn deformation, thereby exhibiting a final size which was a 1.3 times increase in the overall size as compared to the original dimensions. After shrinking, the tighter net structure provided greater opacity, dryness and support for the fiber tufts.

Other sample fluid retractable nonwoven webs were also made and some of them were then wetted out with water. As the water contacted the PVOH fibers, they dissolved back through the support structure, thereby leaving a cleaner, dryer appearance as is more commonly found when using film-like materials.

Having thus described the invention in detail, it should be appreciated that various other modifications and changes may be made in the present invention without departing from the spirit and scope of the following claims.

We claim:

1. A fluid-dissolvable nonwoven web composite comprising:
    a support layer having a top surface and a bottom surface separated by a thickness, and
    a nonwoven web in juxtaposition with said bottom surface of said support layer, said web including a plurality of fibers which are soluble in a fluid, at least a portion of said plurality of fibers extending through said thickness of said support layer from said bottom surface to and above said top surface of said support layer such that upon wetting by said fluid, said fibers which are soluble in said fluid at least partially dissolve and retract toward said bottom surface of said support layer,
    said support layer being capable of expanding in at least one direction from a first length to a second length which is greater than said first length.

2. A fluid-dissolvable nonwoven web composite comprising:
    a support layer having a top surface and a bottom surface separated by a thickness, and
    a nonwoven web in juxtaposition with said bottom surface of said support layer, said web including a plurality of fibers which are soluble in fluid, at least a portion of said plurality of fibers extending through said thickness of said support layer from said bottom surface to and above said top surface of said support layer such that upon wetting by said fluid, said fibers which are soluble in said fluid at least partially dissolve and retract toward said bottom surface of said support layer, said support layer having a first length and after being subjected to heat a second length which is less than said first length.

3. The fluid-dissolvable nonwoven web composite of claim 1 or 2 wherein said nonwoven web contains a plurality of second fibers which are soluble in a second fluid, said second fluid being different from said first fluid.

4. A cover material for a personal care absorbent article comprising the fluid-dissolvable nonwoven web composite of claim 1 or 2, said plurality of fibers being dissolvable in menses or urine.

* * * * *

UNITED STATES PATENT AND TRADEMARK OFFICE
CERTIFICATE OF CORRECTION

PATENT NO. : 5,397,625

DATED : Mar. 14, 1995

INVENTOR(S) : D.K. Osten, H. Rhem, L.H. Sawyer, E.G. Vawna, C.M. Wanek, K.Y. Wang It is certified that error appears in the above-identified patent and that said Letters Patent is hereby corrected as shown below:

Column 6, line 21, "prowess" should read --process--.

Signed and Sealed this

Nineteenth Day of September, 1995

Attest:

BRUCE LEHMAN

Attesting Officer    Commissioner of Patents and Trademarks